(12) United States Patent
Feltz

(10) Patent No.: US 9,058,913 B2
(45) Date of Patent: Jun. 16, 2015

(54) COBALT-FREE NTC CERAMIC AND METHOD FOR PRODUCING A COBALT-FREE NTC CERAMIC

(75) Inventor: Adalbert Feltz, Deutschlandsberg (AT)

(73) Assignee: EPCOS AG, Munich (DE)

( * ) Notice: Subject to any disclaimer, the term of this patent is extended or adjusted under 35 U.S.C. 154(b) by 186 days.

(21) Appl. No.: 13/806,528

(22) PCT Filed: May 19, 2011

(86) PCT No.: PCT/EP2011/058184
§ 371 (c)(1),
(2), (4) Date: Mar. 14, 2013

(87) PCT Pub. No.: WO2011/160904
PCT Pub. Date: Dec. 29, 2011

(65) Prior Publication Data
US 2013/0161574 A1 Jun. 27, 2013

(30) Foreign Application Priority Data

Jun. 24, 2010 (DE) .......................... 10 2010 024 863

(51) Int. Cl.
*H01B 1/08* (2006.01)
*C04B 35/645* (2006.01)
*C04B 35/622* (2006.01)
*H01C 7/04* (2006.01)
*C04B 35/01* (2006.01)
*C04B 35/626* (2006.01)

(52) U.S. Cl.
CPC ............... *H01B 1/08* (2013.01); *C04B 35/645* (2013.01); *C04B 35/622* (2013.01); *H01C 7/044* (2013.01); *C04B 35/016* (2013.01); *C04B 35/62685* (2013.01); *C04B 2235/3268* (2013.01); *C04B 2235/3279* (2013.01); *C04B 2235/3281* (2013.01); *C04B 2235/3284* (2013.01); *C04B 2235/6565* (2013.01); *C04B 2235/72* (2013.01); *C04B 2235/763* (2013.01); *C04B 2235/77* (2013.01); *H01C 7/04* (2013.01); *H01C 7/043* (2013.01)

(58) Field of Classification Search
CPC ........ H01B 1/08; C04B 35/45; C04B 35/622; H01C 7/044

USPC ..................................... 252/521.2; 423/594.3
See application file for complete search history.

(56) References Cited

FOREIGN PATENT DOCUMENTS

| JP | 56114859 | 9/1981 |
|---|---|---|
| JP | 56160007 | 12/1981 |
| JP | 5788701 | 6/1982 |
| JP | 63315559 A | 12/1988 |
| JP | 05021209 | 1/1993 |
| JP | 05041304 | 2/1993 |
| JP | 06-231771 A | 8/1994 |
| JP | 11335163 | 7/1999 |

OTHER PUBLICATIONS

Jadhav et al "Structural and electrical properties of fritless Ni(1-x)CuxMn2O4 . . . ", J. Mater Sci: Mater Electron 2010 21:503-508.*
Zhao et al "The investigation of Zn content on the structure and electrical properties of the ZnxCu0.2Ni0.66Mn2.14-xO4 negative temperature coefficient ceramics", J. Mater Sci: Electron 2012 23:1788-1792.*
Ma et al "Effect of Zn substitution on the phase, microstructure and electrical properties of Ni0.6Cu0.5ZnxMn1.9-xO4 NTC ceramics", Materials Science and Engineering B 188(2014) 66-71.*
English translation (machine translation) of JP 06-231771 A (pub 1994).*
Park, K., et al., "Mn—Ni—Co—Cu—Zn—O NTC thermistors with high thermal stability for low resistance applications," Scripta Materialia, Bd. 57, No. 4, 2007, pp. 329-332, XP022108702.
Park, K., et al., "The effect of ZnO content and sintering temperature on the electrical properties of Cu-containing $Mn_{1.95-x}Ni_{0.45}Co_{0.15}Cu_{0.45}Zn_xO_4$ (0≤x≤0.3) NTC thermistors," Journal of Alloys and Compounds, Bd. 475, No. 1-2, 2009, pp. 513-517, XP026035600.
Zhao, C., et al., "Effects of Cu and Zn co-doping on the electrical properties of $Ni_{0.5}Mn_{2.5}O_4$ NTC ceramics," Journal of European Ceramic Society, Bd. 28, Nr 1, 2008, pp. 34-40.

* cited by examiner

*Primary Examiner* — Mark Kopec
(74) *Attorney, Agent, or Firm* — Slater & Matsil, L.L.P.

(57) ABSTRACT

The invention relates to a cobalt-free NTC ceramic having the composition $Ni_{a'}Cu_{b'}Co_{c'}Mn_{d'}O_4$ where $0.09<a'<0.6$, $0.02<b'<0.65$, $0.12<c'<0.58$ and $1.6<d'<2.1$. The invention further relates to a method for producing a cobalt-free NTC ceramic, the composition of which is derived from a cobalt-containing NTC ceramic of general formula $Ni_aCu_bCo_cMn_dO_4$ where $0.09<a<0.6$, $0.02<b<0.65$, $0.12<c<0.58$ and $1.6<d<2.1$, wherein Co is replaced by Zn.

20 Claims, No Drawings

COBALT-FREE NTC CERAMIC AND METHOD FOR PRODUCING A COBALT-FREE NTC CERAMIC

This patent application is a national phase filing under section 371 of PCT/EP2011/058184, filed May 19, 2011, which claims the priority of German patent application 10 2010 024 863.0, filed Jun. 24, 2010, each of which is incorporated herein by reference in its entirety.

TECHNICAL FIELD

The invention relates to a cobalt-free ceramic and a method for producing a cobalt-free NTC ceramic.

BACKGROUND

NTC ceramics can be used, for example, for insurance current limited (ICL). They are relatively low-impedance semiconductors which, when connected in series with a load resistance (for example a device), can attenuate a switch-on current surge which occurs. As a result of Joule heating, the resistance of an NTC ceramic can rapidly be reduced further during operation with a sufficiently high activation energy, so that high current conduction is achieved within a short time.

The temperature dependency of the resistivity $\rho_T$ of the NTC ceramic can be described to a good approximation in a particular temperature range, for example between 25° C. and 100° C., by the formula $$\rho_T = \rho_{25° C.} \cdot e^{B/t}.$$

Here, $\rho_{25° C.}$ is the resistivity at the reference temperature, the so-called rated temperature, and the B constant according to the relation $E_A = k\,B$ is an expression of the activation energy of the charge transport $E_A$. Here, k stands for Boltzmann's constant.

The resistivity $\rho_{25° C.}$ and the B constant are thus characteristic quantities of an NTC ceramic and, in a particular temperature range, for example between 25° C. and 100° C., define the vertices of the so-called characteristic curve of an NTC ceramic.

NTC ceramics may, for example, be oxide ceramic semiconductors which contain transition metal cations in neighboring oxidation states at crystallographically equivalent lattice sites. A high volume concentration of mobile electrical charge carriers is thereby formed, the transport of which is excited by the lattice vibrations and takes place between lattice sites which are occupied by transition metal cations in neighboring oxidation states. The coupling of electrical charge carriers to lattice vibrations is also referred to as polaron transport.

The isomorphic incorporation of cations with different valency at crystallographically equivalent lattice sites also causes, with a statistical distribution, a binding energy variable from lattice site to lattice site of the polarons to the lattice sites occupied by cations with neighboring oxidation states so that, owing to such variations, a sufficiently high activation energy is set up which ensures a rapid thermally induced current rise.

Such properties have hitherto been implemented on the basis of oxide systems of the form $AB_2O_4$ in phase-homogeneous and phase-heterogeneous mixed phases, which form the spinel structure. In this context, phase-homogeneous means that the constituents of the ceramic based on the spinel structure with the general composition $AB_2O_4$ form a solid solution. The mixed phase is phase-heterogeneous when at least two different spinels of different structure exist next to one another or individual constituents are not, or not fully, dissolved and are therefore also present as a constituent in addition to the solid solution.

The oxide systems contain for example cobalt oxide, nickel oxide and copper oxide, respectively in conjunction with manganese oxide as the main constituent. Depending on the composition, manganese occurs in variable proportions as trivalent and tetravalent, cobalt as divalent and trivalent, copper as divalent and optionally also monovalent, and nickel as divalent.

The different values of the crystal field stabilization energy, to which the transition metal cations in their various oxidation states are subject at the octahedron and tetrahedral sites of the spinel structure, give rise to temperature-dependent cation distributions and often also symmetry distortions, which lead to phase-heterogeneous mixed phases of cubic and tetragonal, or rhombic, spinels of different composition. The electrical properties in such cases result from the superposition of properties of the constituents of a phase-heterogeneous structure, which can be adjusted reproducibly in the manufacturing process.

SUMMARY

The invention relates to a cobalt-free ceramic with a negative temperature coefficient of electrical resistance (NTC ceramic). A method is furthermore provided for producing a cobalt-free NTC ceramic, the composition of which is derived from a cobalt-containing NTC ceramic. The use of the cobalt-free ceramic is a further subject-matter of the application.

DETAILED DESCRIPTION OF ILLUSTRATIVE EMBODIMENTS

In one aspect, the invention provides alternative NTC ceramics which are favorable to produce and substantially correspond to the known oxide systems in terms of their electrical properties, for example their resistivity or the activation energy, i.e., they have the same or similar characteristic curves of $\rho_{25° C.}$ and B.

A cobalt-free ceramic with a negative temperature coefficient of electrical resistance (NTC ceramic) is provided, which has the general formula $Ni_aCu_{b'}Zn_cMn_{d'}O_4$. Here, $0.09<a'<0.6$, $0.02<b'<0.65$, $0.12<c'<0.58$ and $1.6<d'<2.1$. Such NTC ceramics have advantageous electrical properties, i.e., a low resistivity $\rho_{25° C.}$ and a sufficiently high activation energy $E_A$ despite the low resistivity, and are favorable to produce. The favorable production results from the fact that the expensive cobalt component can be obviated in the quaternary spinel system $Ni_aCu_{b'}Zn_cMn_{d'}O_4$.

A low resistivity, for example in an ICL which is connected in series with a device, already ensures current flow at room temperature. The ICL is thereby heated and reaches an even lower resistance, which is finally less than the internal resistance of the device, which now undertakes the limitation of the current flow. The Joule heating of the ceramic of the ICL then no longer increases. This steady state is set up commensurately more rapidly when the activation energy is higher.

At the same time, this NTC ceramic has corresponding or similar properties to a similarly composed cobalt-containing NTC ceramic which, instead of the Zn component, contains a Co component in its composition. The cobalt-containing NTC ceramic has the general composition $Ni_aCu_bCo_cMn_dO_4$ with $0.09<a<0.6$, $0.02<b<0.65$, $0.12<c<0.58$ and $1.6<d<2.1$.

During the production of the cobalt-free NTC ceramic, it is thus possible to obviate the constituent cobalt oxide in the mixed phase and use zinc oxide instead of it, and the composition may be adapted to such an extent that the electrical properties in the form of characteristic curve data, i.e., the B constant characterizing the activation energy $E_A$ of the charge transport and optionally also the resistivity $\rho_{25°\,C.}$, of the cobalt-free NTC ceramic and of the cobalt-containing NTC ceramic differ from one another at most slightly.

A cobalt-free NTC ceramic is provided, which has a B constant, characterizing the activation energy $E_A$ of the charge transport, that differs by less than 1% from the B constant of a cobalt-containing NTC ceramic having the general formula $Ni_aCu_bCo_cMn_dO_4$. a, b, c and d of the cobalt-containing NTC ceramic may respectively be selected from the same range as a', b', c' and d'. a, b, c and d may in this case be equal or different to a', b', c' and d'. Furthermore, a+b+c+d=3 and a'+b'+c'+d'=3.

The B constant of the cobalt-free NTC ceramic may, for example, differ from the B constant of the cobalt-containing ceramic by less than 0.1%.

Besides the B constant, the resistivity $\rho_{25°\,C.}$ of the cobalt-free NTC ceramic may also differ only slightly from the resistivity of the cobalt-containing NTC ceramic. A substantial match of the resistivities of the cobalt-containing and cobalt-free NTC ceramics may furthermore be achieved by adapting the dimensioning of the component containing the NTC ceramic.

A cobalt-free NTC ceramic may have a composition which is selected from a group consisting of $Ni_{0.5748}Cu_{0.3164}Zn_{0.1440}Mn_{1.965}O_4$, $Ni_{0.6168}O_{4.1712}Zn_{0.2614}Mn_{1.9512}O_4$, $Ni_{0.5508}Cu_{0.1413}Zn_{0.2797}Mn_{2.0280}O_4$, $Ni_{0.2817}Cu_{0.3274}Zn_{0.3911}Mn_{2.000}O_4$ and $Ni_{0.4295}Cu_{0.4183}Zn_{0.1522}Mn_{2.000}O_4$.

The electrical properties, i.e., the resistivity $\rho_{25°\,C.}$ and the B constant of a cobalt-containing NTC ceramic, in comparison with a similarly composed cobalt-free NTC ceramic, are collated in the following table:

| Composition | $\rho_{25°\,C.}$ [Ωcm] | $B_{25°\,C./100°\,C.}$ [K] |
|---|---|---|
| $Ni_{0.5553}Cu_{0.2278}Co_{0.2685}Mn_{1.8984}O_4$ | 31 | 2915 |
| $Ni_{0.5748}Cu_{0.3164}Zn_{0.1440}Mn_{1.965}O_4$ | 30.5 | 2910 |
| $Ni_{0.5877}Cu_{0.1290}Co_{0.2835}Mn_{2.000}O_4$ | 97 | 3165 |
| $Ni_{0.6168}Cu_{0.1712}Zn_{0.2614}Mn_{1.9512}O_4$ | 97 | 3164 |
| $Ni_{0.5547}Cu_{0.1080}Co_{0.2817}Mn_{2.0553}O_4$ | 145 | 3300 |
| $Ni_{0.5508}Cu_{0.1413}Zn_{0.2797}Mn_{2.0280}O_4$ | 144 | 3299 |
| $Ni_{0.2817}Cu_{0.1499}Co_{0.5708}Mn_{1.998}O_4$ | 70 | 3060 |
| $Ni_{0.2817}Cu_{0.3274}Zn_{0.3911}Mn_{2.000}O_4$ | 315 | 3062 |
| $Ni_{0.5130}Co_{0.2475}Cu_{0.4602}Mn_{1.7993}O_4$ | 8-12 | 2800 |
| $Ni_{0.4295}Cu_{0.4183}Zn_{0.1522}Mn_{2.000}O_4$ | 9.3 | 2797 |

The With the aid of the table, it can be seen that the B constant of the cobalt-containing NTC ceramic shows a substantial match with the corresponding B constant of the cobalt-free NTC ceramic in the temperature range of from 25° C. to 100° C. The deviation of the B constants is respectively less than 0.1%.

The resistivity $P_{25°\,C.}$ also shows a good match between the cobalt-containing NTC ceramic and the corresponding cobalt-free NTC ceramic. In the event of larger deviations in the resistivity, compensation may be achieved by corresponding dimensioning of the components in which the cobalt-free NTC ceramic is intended to be used.

A method for producing a cobalt-free NTC ceramic is furthermore provided. The composition of the cobalt-free NTC ceramic is derived from a cobalt-containing NTC ceramic having the general formula $Ni_aCu_bCo_cMn_dO_4$ with 0.09<a<0.6, 0.02<b<0.65, 0.12<c<0.58 and 1.6<d<2.1, Co being replaced by Zn. The method comprises the method steps A) formal decomposition of $Ni_aCu_bCo_cMn_dO_4$ into spinel components, which respectively contain at least one oxide of Ni, Cu, Co or Mn, B) formal replacement of the at least cobalt-containing spinel components by cobalt-free spinel components, C) formal composition of the at least partially replaced spinel components to form an intermediate stage having the composition $Ni_\alpha Cu_\beta Zn_\gamma Mn_\delta O_4$ with 0.09<α<0.6, 0.02<β<0.65, 0.12<γ<0.58 and 1.6<δ<2.1, D) adaptation of α, β, γ and δ in order to obtain a composition $Ni_{a'}Cu_{b'}Zn_{c'}Mn_{d'}O_4$ with 0.09<a'<0.6, 0.02<b'<0.65, 0.12<c'<0.58 and 1.6<d'<2.1, E) production of a ceramic having the composition $Ni_{a'}Cu_{b'}Zn_{c'}Mn_{d'}O_4$ from starting substances.

The adaptation in method step D) is carried out while assimilating the electrical properties of the cobalt-free NTC ceramic to the electrical properties of the cobalt-containing NTC ceramic.

The starting substances in method step E) may, for example, be selected from metal oxides and/or metal carbonates.

For the coefficients of the intermediate stage obtained in method step C), α+β+γ+δ=3 applies.

It has been discovered that the electrical properties of the quaternary spinel systems or of the spinel mixed phase $Ni_aCu_bCo_cMn_dO_4$ can be attributed approximately to a corresponding mixture of spinel components which may have high or low impedance. High-impedance spinels are for example $CoMn_2O_4$, $Co_3O_4$, $Mn_3O_4$, and $ZnMn_2O_4$, and low-impedance spinels are for example $NiCo_2O_4$ and $CuMn_2O_4$, with $NiMn_2O_4$, $MnCo_2O_4$ and $Zn_{1.5}Mn_{1.5}O_4$, assuming an intermediate position. This decomposition simplifies the replacement of cobalt by zinc in the quaternary cobalt-containing NTC ceramic and the adaptation of the electrical properties of a zinc-containing spinel to the predetermined values of a cobalt-containing spinel.

In the method, the spinel components in method step A) may be selected from a group consisting of $CuMn_2O_4$, $NiMn_2O_4$, $MnCo_2O_4$, $NiCo_2O_4$, $Co_3O_4$, $CoMn_2O_4$ and $Mn_3O_4$.

$Co_3O_4$ may be selected in the case of a cobalt oxide excess in the quaternary spinel in method step A), $Mn_3O_4$ in the case of a manganese oxide excess and $NiCo_2O_4$ in the case of an insufficient manganese oxide content.

These spinels, into which the cobalt-containing NTC ceramic can be decomposed in method step A), are the low-impedance cubic spinels $CuMn_2O_4$, $NiMn_2O_4$, $MnCo_2O_4$, $NiCo_2O_4$ and the high-impedance spinels $Co_3O_4$, $CoMn_2O_4$ and $Mn_3O_4$. $CoMn_2O_4$ and $Mn_3O_4$ are tetragonally distorted spinels which are only limitedly soluble in the cubic spinels of the mixture, so that phase-heterogeneous structures can also be formed when the NTC ceramic is decomposed, inter alia, into these two compounds and the limits of the solubility are exceeded. The decomposition is carried out approximately in such a way that the individual components of the quaternary cobalt-containing spinel are substantially present in the same amount as in the quaternary spinel in the various individual components into which the cobalt-containing NTC ceramic is decomposed.

The cobalt-free spinel components in method step B) may be selected from $ZnMn_2O_4$, $Zn_{1.5}Mn_{1.5}O_4$, and $CuMn_2O_4$. Zinc-containing spinels may thus be selected in particular. The high-impedance cobalt-containing spinels $CoMn_2O_4$ and $Co_3O_4$, and optionally $Mn_3O_4$ which also has a high impedance, may therefore be replaced by the likewise high-impedance spinel $ZnMn_2O_4$ or alternatively $Zn_{1.5}Mn_{1.5}O_4$. Furthermore, $NiCo_2O_4$ is substituted by $CuMn_2O_4$ when there was an insufficient Mn content in the original NTC ceramic.

In method step C), the cobalt-free NTC ceramic $Ni_\alpha Cu_\beta Zn_\gamma Mn_\delta O_4$ is obtained as intermediate stage, the stoichiometric coefficients $\alpha$, $\beta$, $\gamma$ and $\delta$ of which are adapted in method step D) in such a way that the stoichiometric coefficients a', b', c', and d' result, which specify the formulation for a cobalt-free ceramic whose electrical properties coincide substantially with the electrical properties of the cobalt-containing ceramic.

The adaptation in method step D) may be carried out while assimilating the electrical properties of the cobalt-free NTC ceramic to the electrical properties of the cobalt-containing NTC ceramic. The adaptation may be carried out in such a way that the B constant of the cobalt-free NTC ceramic differs by less than 1%, preferably by less than 0.1%, from the B constant of the cobalt-containing NTC ceramic.

Adaptation may, for example, be carried out by varying the proportions of the high-impedance spinel $ZnMn_2O_4$ and of the low-impedance spinel $CuMn_2O_4$, or alternatively of the high-impedance spinel $Mn_3O_4$ and of the low-impedance spinel $CuMn_2O_4$ in the phase-homogeneous or phase-heterogeneous quaternary mixed phase, i.e., in the cobalt-free intermediate stage obtained in method step C). $NiMn_2O_4$ and $Zn_{1.5}Mn_{1.5}O_4$ may also be included in the variation. The values a', b', c', and d', determined on the basis of $Ni_\alpha Cu_\beta Zn_\gamma Mn_\delta O_4$, are thereby obtained for a cobalt-free NTC ceramic whose electrical properties is specified by the cobalt-containing ceramic and is substantially assimilated thereto.

Method step D) may comprise the steps D1) of synthesizing the NTC ceramic intermediate stage $Ni_\alpha Cu_\beta Zn_\gamma Mn_\delta O_4$ obtained in method step C), D2) of determining the characteristic curve data of the NTC ceramic, D3) of adapting the coefficients $\alpha$, $\beta$, $\gamma$ and $\delta$ of the intermediate stage while assimilating the electrical properties to the electrical properties of the cobalt-containing NTC ceramic. A new intermediate stage $Ni_\alpha Cu_\beta Zn_\gamma Mn_\delta O_4$ may thus be obtained in method step D), and method step D) may be repeated and the cobalt-free NTC ceramic $Ni_a Cu_b Zn_c Mn_d O_4$ may be obtained after a few repetitions. Method step D) may, for example, be repeated at least two times. The cobalt-free NTC ceramic $Ni_a Cu_b Zn_c Mn_d O_4$ may also be obtained after carrying out method step D) once.

The adaptation in method step D) may, for example, be carried out by chemically producing the ratio of the high- and low-impedance spinels obtained in method step C) in the formulation $Ni_\alpha Cu_\beta Zn_\gamma Mn_\delta O_4$ and measuring the characteristic curve data of the NTC ceramic thereby obtained, i.e., its resistivity and the B constant. Owing to the given correlation with the proportions of high- and low-impedance spinels in the composition, comparison of the electrical properties of this cobalt-free NTC ceramic with the electrical properties of the cobalt-containing NTC ceramic makes it possible to derive the next step of the adaptation by interpolation or extrapolation. In this way, by means of a few, generally up to at most five adaptation steps, i.e., repetitions of method step D), it is possible to obtain a cobalt-free composition $Ni_a Cu_b Zn_c Mn_d O_4$ whose B constant is adapted to the B constant of the cobalt-containing NTC ceramic.

The method may comprise the following method steps in method step E):

E1) mixing and calcining the starting substances in the stoichiometric ratio and E2) sintering the material obtained in method step E1).

The starting substances may be selected from a group consisting of manganese oxide, nickel carbonate, copper oxide or zinc oxide.

The formulation, which has been provided by means of method steps A), B), C) and D), is therefore processed to form an NTC ceramic in method step E).

According to this method, for example, the spinel mixed phase $Ni_{0.5553}Cu_{0.2278}Co_{0.2685}Mn_{1.8984}O_4$ may be formally decomposed into 0.5553 $NiMn_2O_4$, 0.2778 $CuMn_2O_4$, 0.0653 $CoMn_2O_4$ and 0.1016 $MnCo_2O_4$ in method step A). This cobalt-containing NTC ceramic has a resistivity $\rho_{25°\,C.}$ of 31 Ωcm and a B constant of 2915 K. $CoMn_2O_4$ may then be replaced by $ZnMn_2O_4$ and $MnCo_2O_4$ by ⅔ $Zn_{1.5}Mn_{1.5}O_4$ in method step B), so that a composition of $Ni_{0.5748}Cu_{0.2874}Zn_{0.1728}Mn_{1.965}O_4$ results in method step C) for the cobalt-free NTC ceramic as the intermediate stage, which has a resistivity $\rho_{25°\,C.}$ of 38 Ωcm and a B constant of 2990 K. If the electrical values are intended to be adapted to those of the cobalt-containing NTC ceramic, then for example 10 mol % of the $CuMn_2O_4$ may additionally be incorporated instead of $ZnMn_2O_4$ in method step D), so that the composition $Ni_{0.5748}Cu_{0.3164}Zn_{0.1440}Mn_{1.965}O_4$ is finally obtained in method step D). This composition has the properties $\rho_{25°\,C.}=30.5$ Ωcm and a B constant of 2910 K, which corresponds substantially to the respective values of the cobalt-containing NTC ceramic.

In the method, furthermore, $Ni_{0.5877}Cu_{0.1290}Co_{0.2835}Mn_{2.000}O_4$ as the cobalt-containing NTC ceramic may be formally decomposed into 0.5877 $NiMn_2O_4$, 0.1290 $CuMn_2O_4$ and 0.2835 $CoMn_2O_4$ in method step A). This cobalt-containing ceramic has a $\rho_{25°\,C.}$ of 97 106 cm and a B constant of 3165 K. $CoMn_2O_4$ may be replaced by $ZnMn_2O_4$ in method step B), so that a cobalt-free NTC ceramic of the composition $Ni_{0.5877}Cu_{0.1290}Zn_{0.2835}Mn_{2.000}O_4$ is obtained as the intermediate stage in method step C). This cobalt-free NTC ceramic has a resistivity $\rho_{25°\,C.}$ of 167 Ωcm and a B constant of 3285 K. In order to adapt the electrical values of the cobalt-free NTC ceramic to the electrical values provided by the cobalt-containing NTC ceramic, after a few repetitions of method step D), for example, the proportions of $NiMn_2O_4$ may be increased by 4.95 mol % and $CuMn_2O_4$ by 32.8 mol % and 60 mol % of the $ZnMn_2O_4$ content may be replaced by 0.0984 $Zn_{1.5}Mn_{1.5}O_4$. As a result of the method step D) carried out last, this gives an NTC ceramic of the composition $Ni_{0.6168}Cu_{0.1712}Zn_{0.2614}Mn_{1.512}O_4$ with a resistivity $\rho_{25°\,C.}$ of 97 Ωcm and a B constant of 3164 K.

In the method, furthermore, $Ni_{0.5547}Cu_{0.1080}Co_{0.2817}Mn_{2.0553}O_4$ may be formally decomposed into 0.5547 $NiMn_2O_4$, 0.1080 $CuMn_2O_4$, 0.2817 $CoMn_2O_4$ and 0.0555 $Mn_3O_4$ in method step A). The cobalt-containing NTC ceramic has a $\rho_{25°\,C.}$ of from 140 to 200 Ωcm, for example 145 Ωcm, and a B constant of 3300 K. $CoMn_2O_4$ may then be replaced by $ZnMn_2O_4$ in method step B), so that $Ni_{0.5547}Cu_{0.1080}Zn_{0.2817}Mn_{2.0553}O_4$ is obtained after the formal composition according to method step C). The electrical properties of this composition are $\rho_{25°\,C.}=277$ Ωcm and B=3467 K. The adaptation of the electrical values to the electrical values provided by the cobalt-containing NTC ceramic in method step D) may, for example, be achieved by reducing the $NiMn_2O_4$ and $ZnMn_2O_4$ contents respectively by 0.7 mol % and increasing the proportion of $CuMn_2O_4$ by 30.8 mol % while simultaneously reducing the proportion of $Mn_3O_4$ by 49.3 mol %. This adaptation may be carried out within a few repetitions of method step D). This gives a cobalt-free NTC ceramic with the composition $Ni_{0.5508}Cu_{0.1413}Zn_{0.2797}Mn_{2.0280}O_4$. This ceramic has a $\rho_{25°C}$ of 144 Ωcm and a B constant of 3299 K. These values again have a good match with the respective values of the cobalt-containing NTC ceramic.

According to the method, for example, $Ni_{0.2817}Cu_{0.1499}Co_{0.5708}Mn_{1.998}O_4$ may also be formally decomposed into 0.2817 $NiMn_2O_4$, 0.1499 $CuMn_2O_4$, 0.5673 $CoMn_2O_4$ and 0.00115 $Co_3O_4$ in method step A). The cobalt-containing NTC ceramic has a $\rho_{25°C}$ of 70 Ωcm and a B constant of 3060 K. For example, the sum of the two cobalt spinel compounds may be formally replaced, in method step B) by 0.5685 $ZnMn_2O_4$ and 31.2 mol % thereof by $CuMn_2O_4$, so that the composition $Ni_{0.2817}Zn_{0.3911}Cu_{0.3274}Mn_{2.000}O_4$ results after method step C) and in method step D). This gives a B constant of 3062 K and a $\rho_{25°C}$ of 315 Ωm. Since the resistivity of the cobalt-free NTC ceramic differs from the cobalt-containing NTC ceramic in this case, the resistance value may also be adapted by the structural shape, for example be surface area and/or thickness of the ceramic component. Further adaptation by modifying the composition may likewise be envisioned.

In the method, furthermore, $Ni_{0.5130}Cu_{0.4602}Co_{0.2475}Mn_{1.7993}O_4$ may be decomposed into 0.42945 $NiMn_2O_4$, 0.4602 $CuMn_2O_4$, 0.08355 $NiCo_2O_4$ and 0.02680 $Co_3O_4$ in method step A). This cobalt-containing ceramic has a resistivity $\rho_{25°C}$ of from 8 to 12 Ωcm and a B constant of 2800 K. It furthermore has a low Mn content so that $NiCo_2O_4$ and $Co_3O_4$ are also to be taken into account besides $NiMn_2O_4$ and $CuMn_2O_4$ for the formal decomposition into spinel components. $NiCo_2O_4$ may be replaced by $CuMn_2O_4$ and $Co_3O_4$ by $ZnMn_2O_4$ in method step B). This initially gives the cobalt-free NTC ceramic $Ni_{0.4295}Zn_{0.0268}Cu_{0.5438}Mn_{2.000}O_4$ with the electrical properties $\rho_{25°C}$=4.8 Ωcm and B=2672 K in method step C). The adaptation to the electrical properties of the cobalt-containing NTC ceramic in method step D) may, for example, be carried out by increasing the $ZnMn_2O_4$ content to 0.1522 $ZnMn_2O_4$ and reducing the $CuMn_2O_4$ content by the same amount to 0.4183 $CuMn_2O_4$. This gives the cobalt-free NTC ceramic $Ni_{0.4295}Cu_{0.4183}Zn_{0.1522}Mn_{2.000}O_4$ with the properties $\rho_{25°C}$=9.3 Ωcm and B=2797 K in method step C).

The use of a cobalt-free NTC ceramic, which is produced by the method above, as an inrush current limiter is furthermore provided. Based on the electrical properties explained above, which differ at most slightly from those of cobalt-containing NTC ceramics, the cobalt-free NTC ceramics are suitable for inrush current limitation owing to their low resistivity and their suitable activation energy.

The production of a cobalt-free NTC ceramic will be explained in more detail below with the aid of an exemplary embodiment.

The method may, for example, be carried out by the mixed oxide method in method step E). In this case the starting substances, for example manganese oxide, nickel carbonate, copper oxide or zinc oxide, are mixed in the stoichiometric ratio of the metal cations which has been determined by means of method steps A) to D). The starting substances should in this case have an analytically controlled impurity content of trace elements which is as low as possible. The starting substances may, for example, be wet-mixed.

After wet mixing of the starting substances, slurry resulting therefrom is concentrated by evaporation, dried and screened, and subsequently calcined at for example 850° C. for four hours. With further heating, the formation of the spinel phase, which has already started during the calcining, may be completed. The material obtained is ground using $ZrO_2$ balls, for example in an eccentric mill, to a median diameter $d_{50}$ of about 1 μm. Calcining is subsequently carried out for a second time at about 900° C., for instance for four hours.

In a further step, fine grinding of the material to a median diameter $d_{50}$ of less than 1 μm may be carried out. The material is thereupon granulated and pressed into the cylindrical samples, which may have dimensions of for example 5.5 mm diameter and from 1.5 to 1.55 mm height and are sintered on corundum sintering plates, for example ALOX bases, at about 1210° C. for two hours. The sintering is ended with stepwise cooling to 1000° C. for two hours, 800° C. for one hour, 700° C. for two hours and 600° C. for three hours. If the NTC ceramic has an increased copper content and reduced manganese content, sintering is carried out for two hours at 1100° C. and cooling is carried out stepwise to 900° C. for one hour, 800° C. for one hour, 700° C. for two hours and 600° C. for three hours. With this method, relative densities of more than 98% are achieved for the cobalt-free NTC ceramic.

The measurement of the electrical properties, i.e., the resistivity and the B constant of the samples, is carried out at 25° C. and 100° C. after applying a silver paste as an electrical contact onto the cylindrical samples and burning it in at about 750° C. Of each cobalt-free NTC ceramic, from 10 to 15 sintered samples are measured and average values are taken.

The NTC ceramics produced in this way may, for example, be used in components for inrush current limitation.

The invention is not restricted to the embodiments and exemplary embodiments specified, but is susceptible of further configurations not mentioned here.

The invention claimed is:

1. A cobalt-free ceramic with a negative temperature coefficient of electrical resistance (NTC ceramic), having the general formula $Ni_{a'}Cu_{b'}Zn_{c'}Mn_{d'}O_4$ with 0.09<a'<0.6, 0.02<b'<0.65, 0.12<c'<0.58 and 1.6<d'<2.1.

2. The cobalt-free NTC ceramic according to claim 1, which has a B constant, characterizing the activation energy $E_A$ of the charge transport, that differs by less than 1% from the B constant of a cobalt-containing NTC ceramic having the general formula $Ni_aCu_bCo_cMn_dO_4$ with 0.09<a<0.6, 0.02<b<0.65, 0.12<c<0.58 and 1.6<d<2.1, where a, b, c and d are respectively equal or unequal to a', b', c' and d'.

3. The cobalt-free NTC ceramic according to claim 1, wherein the ceramic has a composition selected from the group consisting of $Ni_{0.5748}O_{4.3164}Zn_{0.1440}Mn_{1.965}O_4$, $Ni_{0.6168}Cu_{0.1712}Zn_{0.2614}Mn_{1.9512}O_4$, $Ni_{0.5508}Cu_{0.1413}Zn_{0.2797}Mn_{2.0280}O_4$, $Ni_{0.2817}Cu_{0.3274}Zn_{0.3911}Mn_{2.000}O_4$ and $Ni_{0.4295}O_{4.4183}Zn_{0.1522}Mn_{2.000}O_4$.

4. The cobalt-free NTC ceramic according to claim 3, wherein the ceramic has a composition of $Ni_{0.5748}Cu_{0.3164}Zn_{0.1440}Mn_{1.965}O_4$.

5. The cobalt-free NTC ceramic according to claim 3, wherein the ceramic has a composition of $Ni_{0.6168}Cu_{4.1712}Zn_{0.2614}Mn_{1.9512}O_4$.

6. The cobalt-free NTC ceramic according to claim 3, wherein the ceramic has a composition of $Ni_{0.5508}Cu_{4.1413}Zn_{0.2797}Mn_{2.0280}O_4$.

7. The cobalt-free NTC ceramic according to claim 3, wherein the ceramic has a composition of $Ni_{0.2817}Cu_{4.3274}Zn_{0.3911}Mn_{2.000}O_4$.

8. The cobalt-free NTC ceramic according to claim 3, wherein the ceramic has a composition of $Ni_{0.4295}Cu_{4.4183}Zn_{0.1522}Mn_{2.000}O_4$.

9. An inrush current limiter comprising the cobalt-free NTC ceramic of claim 1.

10. A method for producing a cobalt-free NTC ceramic, the composition of which is derived from a cobalt-containing NTC ceramic having the general formula $Ni_aCu_bCo_cMn_dO_4$ with $0.09<a<0.6$, $0.02<b<0.65$, $0.12<c<0.58$ and $1.6<d<2.1$, Co being replaced by Zn, comprising the method steps:
   A) formal decomposition of $Ni_aCu_bCo_cMn_dO_4$ into spinel components, which respectively contain at least one oxide of Ni, Cu, Co or Mn,
   B) formal replacement at least of the cobalt-containing spinel components by cobalt-free spinel components,
   C) formal composition of the at least partially replaced spinel components to form an intermediate stage having the composition $Ni_\alpha Cu_\beta Zn_\gamma Mn_\delta O_4$ with $0.09<\alpha<0.6$, $0.02<\beta<0.65$, $0.12<\gamma<0.58$ and $1.6<\delta<2.1$,
   D) adaptation of $\alpha$, $\beta$, $\gamma$ and $\delta$ in order to obtain a composition $Ni_{a'}Cu_{b'}Zn_{c'}Mn_{d'}O_4$ with $0.09<a'<0.6$, $0.02<b'<0.65$, $0.12<c'<0.58$ and $1.6<d'<2.1$, wherein the adaptation is carried out while assimilating the electrical properties of the cobalt-free NTC ceramic to the electrical properties of the cobalt-containing NTC ceramic,
   E) production of a ceramic having the composition $Ni_{a'}Cu_{b'}Zn_{c'}Mn_{d'}O_4$ from starting substances, wherein the starting substances are mixed in the stoichiometric ratio of the metal cations as determined by method steps A) to D) and wherein a', b', c' and d' are as defined in step D above.

11. The method according to claim 10, wherein the spinel components in method step A) are selected from the group consisting of $CuMn_2O_4$, $NiMn_2O_4$, $MnCo_2O_4$, $NiCo_2O_4$, $Co_3O_4$, $CoMn_2O_4$ and $Mn_3O_4$.

12. The method according to claim 11, wherein the cobalt-free spinel components in method step B) are selected from the group consisting of $ZnMn_2O_4$, $Zn_{1.5}Mn_{1.5}O_4$, and $CuMn_2O_4$.

13. The method according to claim 10, wherein the assimilation of the electrical properties of the cobalt-free NTC ceramic to the electrical properties of the cobalt-containing NTC ceramic is carried out in such a way that the B constant of the cobalt-free NTC ceramic differs by less than 1% from the B constant of the cobalt-containing NTC ceramic.

14. The method according to claim 10, wherein method step D) is repeated at least two times.

15. The method according to claim 10, wherein method step E) comprises the following method steps:
   E1) mixing and calcining the starting substances in the stoichiometric ratio, and
   E2) sintering the material obtained in method step E1).

16. The method according to claim 10, wherein $Ni_{0.5553}Cu_{0.2278}Co_{0.2685}Mn_{1.8984}O_4$ is formally decomposed into $0.5553\ NiMn_2O_4$, $0.2778\ CuMn_2O_4$, $0.0653\ CoMn_2O_4$ and $0.1016\ MnCo_2O_4$ in method step A), $CoMn_2O_4$ is formally replaced by $ZnMn_2O_4$ and $MnCo_2O_4$ by $2/3\ Zn_{1.5}Mn_{1.5}O_4$ in method step B) and the composition $Ni_{0.5748}Cu_{0.3164}Zn_{0.1440}Mn_{1.965}O_4$ is obtained in method step D).

17. The method according to claim 10, wherein $Ni_{0.5877}Cu_{0.1290}Co_{0.2835}Mn_{2.000}O_4$ is formally decomposed into $0.5877\ NiMn_2O_4$, $0.1290\ CuMn_2O_4$ and $0.2835\ CoMn_2O_4$ in method step A), $CoMn_2O_4$ is formally replaced by $ZnMn_2O_4$ in method step B) and the composition $Ni_{0.6168}Cu_{0.1712}Zn_{0.2614}Mn_{1.9512}O_4$ is obtained in method step D).

18. The method according to claim 10, wherein $Ni_{0.5547}Cu_{0.1080}Co_{0.2817}Mn_{2.0553}O_4$ is formally decomposed into $0.5547\ NiMn_2O_4$, $0.1080\ CuMn_2O_4$, $0.2817\ CoMn_2O_4$ and $0.0555\ Mn_3O_4$ in method step A), $CoMn_2O_4$ is formally replaced by $ZnMn_2O_4$ in method step B) and the composition $Ni_{0.5508}Cu_{0.1413}Zn_{0.2797}Mn_{2.0280}O_4$ is obtained in method step D).

19. The method according to claim 10, wherein $Ni_{0.2817}Cu_{0.1499}Co_{0.5708}Mn_{1.998}O_4$ is formally decomposed into $0.2817\ NiMn_2O_4$, $0.1499\ CuMn_2O_4$, $0.5673\ CoMn_2O_4$ and $0.00115\ Co_3O_4$ in method step A), $CoMn_2O_4$ and $Co_3O_4$ are formally replaced by $ZnMn_2O_4$ and $CuMn_2O_4$ in method step B) and the composition $Ni_{0.2817}Cu_{0.3274}Zn_{0.3911}Mn_{2.000}O_4$ is obtained in method step D).

20. The method according to claim 10, wherein $Ni_{0.5130}Cu_{0.4602}Co_{0.2475}Mn_{1.7993}O_4$ is formally decomposed into $0.42945\ NiMn_2O_4$, $0.4602\ CuMn_2O_4$, $0.08355\ NiCo_2O_4$ and $0.02680\ Co_3O_4$ in method step A), $NiCo_2O_4$ is formally replaced by $CuMn_2O_4$ and $Co_3O_4$ by $ZnMn_2O_4$ in method step B) and the composition $Ni_{0.4295}Cu_{0.4183}Zn_{0.1522}Mn_{2.000}O_4$ is obtained in method step D).

* * * * *

UNITED STATES PATENT AND TRADEMARK OFFICE
CERTIFICATE OF CORRECTION

PATENT NO. : 9,058,913 B2
APPLICATION NO. : 13/806528
DATED : June 16, 2015
INVENTOR(S) : Adalbert Feltz Page 1 of 1

It is certified that error appears in the above-identified patent and that said Letters Patent is hereby corrected as shown below:

Specification,

In Col. 3, line 32, Detailed Description of Illustrative Embodiments, delete "$Ni_{0.6168}O_{4.1712}Zn_{0.2614}Mn_{1.9512}O_4$," and insert --$Ni_{0.6168}Cu_{0.1712}Zn_{0.2614}Mn_{1.9512}O_4$,--.

Claims,

In Col. 8, line 48, claim 3, delete "$Ni_{0.5748}O_{4.3164}Zn_{0.1440}Mn_{1.965}O_4$," and insert --$Ni_{0.5748}Cu_{0.3164}Zn_{0.1440}Mn_{1.965}O_4$,--.

In Col. 8, line 52, claim 3, delete "$Ni_{4295}O_{4.4183}Zn_{0.1522}Mn_{2.000}O_4$." and insert --$Ni_{0.4295}Cu_{0.4183}Zn_{0.1522}Mn_{2.000}O_4$.--.

In Col. 8, line 58, claim 5, delete "$Ni_{0.6168}Cu_{4.1712}Zn_{0.2614}Mn_{1.9512}O_4$." and insert --$Ni_{0.6168}Cu_{0.1712}Zn_{0.2614}Mn_{1.9512}O_4$.--.

In Col. 8, line 61, claim 6, delete "$Ni_{0.5508}Cu_{4.1413}Zn_{0.2797}Mn_{2.0280}O_4$." and insert --$Ni_{0.5508}Cu_{0.1413}Zn_{0.2797}Mn_{2.0280}O_4$.--.

In Col. 8, line 64, claim 7, delete "$Ni_{0.2817}Cu_{4.3274}Zn_{0.3911}Mn_{2.000}O_4$." and insert --$Ni_{0.2817}Cu_{0.3274}Zn_{0.3911}Mn_{2.000}O_4$.--.

In Col. 8, line 67, claim 8, delete "$Ni_{0.4295}Cu_{4.4183}Zn_{0.1522}Mn_{2.000}O_4$." and insert --$Ni_{0.4295}Cu_{0.4183}Zn_{0.1522}Mn_{2.000}O_4$.--.

Signed and Sealed this
Twenty-fourth Day of November, 2015

Michelle K. Lee
*Director of the United States Patent and Trademark Office*